US012454450B1

(12) United States Patent
Waugh et al.

(10) Patent No.: US 12,454,450 B1
(45) Date of Patent: Oct. 28, 2025

(54) LEAK DETECTION OF AN AUTOFILL PITCHER DISPENSING SYSTEM FOR A REFRIGERATOR APPLIANCE

(71) Applicant: Haier US Appliance Solutions, Inc., Wilmington, DE (US)

(72) Inventors: Joseph Thomas Waugh, Louisville, KY (US); Jose Rafael Padron, Louisville, KY (US); Jordan Andrew Waymeyer, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 18/650,696

(22) Filed: Apr. 30, 2024

(51) Int. Cl.
*B67D 1/12* (2006.01)
*F25D 23/12* (2006.01)

(52) U.S. Cl.
CPC ........... *B67D 1/1238* (2013.01); *B67D 1/124* (2013.01); *F25D 23/126* (2013.01); *B67D 2001/1263* (2013.01); *B67D 2210/00036* (2013.01); *F25D 2323/122* (2013.01); *F25D 2331/81* (2013.01)

(58) Field of Classification Search
CPC . B67D 7/362; F25D 2323/122; F25D 23/126; F25D 2700/00
See application file for complete search history.

(56) References Cited

U.S. PATENT DOCUMENTS

| | | | |
|---|---|---|---|
| 9,085,453 B2 | 7/2015 | McMahan et al. | |
| 9,421,503 B2 | 8/2016 | An et al. | |
| 10,233,070 B2 | 3/2019 | Comsa et al. | |
| 10,794,628 B2 * | 10/2020 | Park | F25D 23/126 |
| 11,780,722 B1 | 10/2023 | Wantland et al. | |
| 2015/0059887 A1 * | 3/2015 | Masuda | G01M 3/18 137/551 |
| 2024/0077249 A1 * | 3/2024 | Jeong | F25D 23/025 |

FOREIGN PATENT DOCUMENTS

| | | |
|---|---|---|
| CN | 113551844 A | 10/2021 |

* cited by examiner

*Primary Examiner* — Timothy P. Kelly
(74) *Attorney, Agent, or Firm* — Dority & Manning, P.A.

(57) ABSTRACT

A refrigerator appliance includes a cabinet defining a chilled chamber, a door rotatably hinged to the cabinet to provide selective access to the chilled chamber, and an autofill pitcher dispensing system. The system includes a removable pitcher defining an interior portion, a dispenser defining a cavity within the chilled chamber to receive the pitcher and including a fill tube for directing water from a water supply into the interior portion of the pitcher, an electrically operated sensor configured to detect an operational status of the system and generate a signal associated with the detected operational status, and a controller electrically coupled to the sensor. The controller is configured to determine when the autofill pitcher dispensing system is experiencing a leaking condition based on the generated signal.

16 Claims, 7 Drawing Sheets

LEAK DETECTION OF AN AUTOFILL PITCHER DISPENSING SYSTEM FOR A REFRIGERATOR APPLIANCE

FIELD OF THE INVENTION

The present subject matter relates generally to refrigerator appliances, and more particularly to autofill water dispensing systems for refrigerator appliances.

BACKGROUND OF THE INVENTION

Some refrigerator appliances include autofill pitcher dispensing systems. Autofill pitcher dispensing systems typically include a dispensing housing and a pitcher. When the pitcher is positioned in a designated spot, e.g., beneath the autofill housing, water or another liquid is automatically dispensed into the pitcher. Some autofill pitcher dispensing systems include a pitcher present sensor in the dispensing housing and a trigger device in the pitcher to determine when the pitcher is in the correct position to accept the dispensed liquid. In addition to the pitcher present sensor, some pitchers include a pitcher full sensor including a float mechanism positioned within a housing of the pitcher that moves upward with the rising liquid in the pitcher. When the liquid within the pitcher has reached a designated fill level, the float mechanism triggers the system to cease dispensing liquid.

Oftentimes, the autofill pitcher dispensing systems are exposed to external water or "leaks" due to splashing, overfilling of the pitcher, condensation, improper assembly, and/or the like which may reach and contact electronic sensors of the autofill pitcher dispensing system, such as the pitcher full sensor and/or the pitcher present sensor. Such external water may interfere with sensor operations and lead to false readings.

Accordingly, a refrigerator appliance having an improved autofill pitcher dispensing system would be desirable. More specifically, an autofill pitcher dispensing system that is capable of detecting leak conditions would be particularly beneficial.

BRIEF DESCRIPTION OF THE INVENTION

Aspects and advantages of the invention will be set forth in part in the following description, may be apparent from the description, or may be learned through practice of the invention.

According to an exemplary embodiment, a refrigerator appliance defining a vertical direction, a lateral direction, and a transverse direction is provided. The refrigerator appliance includes a cabinet defining a chilled chamber, a door rotatably hinged to the cabinet to provide selective access to the chilled chamber, and an autofill pitcher dispensing system. The autofill pitcher dispensing system includes a removable pitcher defining an interior portion, a dispenser defining a cavity within the chilled chamber to receive the removable pitcher, the dispenser including a fill tube for directing water from a water supply into the interior portion of the removable pitcher, an electrically operated sensor configured to detect an operational status of the autofill pitcher dispensing system, the electrically operated sensor also configured to generate a signal associated with the detected operational status, and a controller electrically coupled to the electrically operated sensor. The controller is configured to determine when the autofill pitcher dispensing system is experiencing a leaking condition based on the generated signal.

According to another exemplary embodiment, an autofill pitcher dispensing system for a refrigerator appliance defining a vertical direction, a lateral direction, and a transverse direction and including a cabinet defining a chilled chamber and a door rotatably hinged to the cabinet to provide selective access to the chilled chamber. The autofill pitcher dispensing system includes a removable pitcher defining an interior portion, a dispenser defining a cavity within the chilled chamber to receive the removable pitcher, the dispenser including a fill tube for directing water from a water supply into the interior portion of the removable pitcher, an electrically operated sensor configured to detect an operational status of the autofill pitcher dispensing system, the electrically operated sensor also configured to generate a signal associated with the detected operational status, and a controller electrically coupled to the electrically operated sensor. The controller is configured to determine when the autofill pitcher dispensing system is experiencing a leaking condition based on the generated signal.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION OF THE INVENTION

Figure 1:
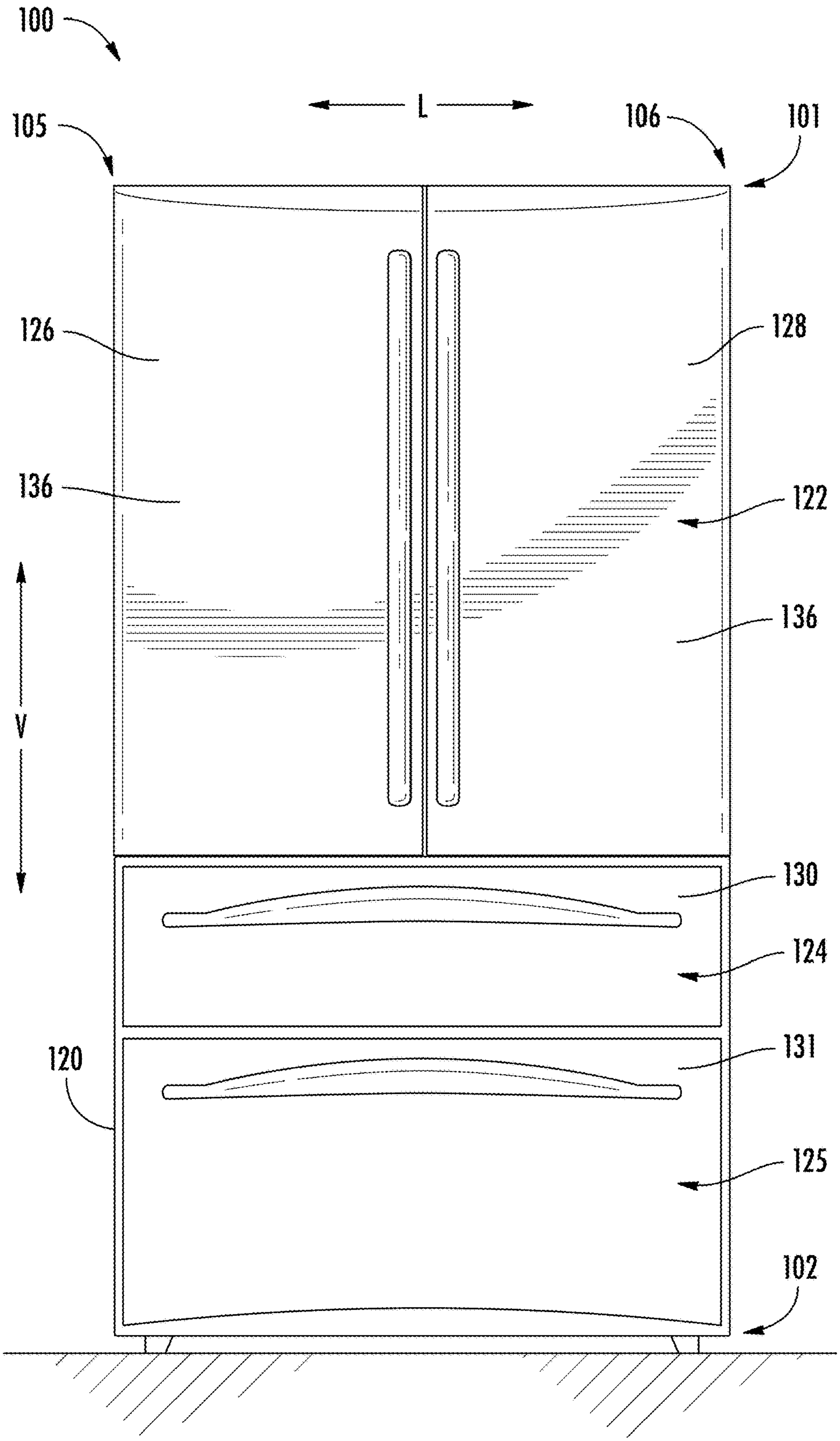
FIG. 1 provides a front view of a refrigerator appliance according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a front view of a refrigerator appliance 100 according to an exemplary embodiment of the present disclosure. Refrigerator appliance 100 includes a cabinet or housing 120 that extends between a top 101 and a bottom 102 along a vertical direction V, between a first side 105 and a second side 106 along a lateral direction L, and between a front side and a back side along a transverse direction T (not shown). Each of the vertical direction V, lateral direction L, and transverse direction T are mutually perpendicular to one another and form an orthogonal direction system.

Figure 2:
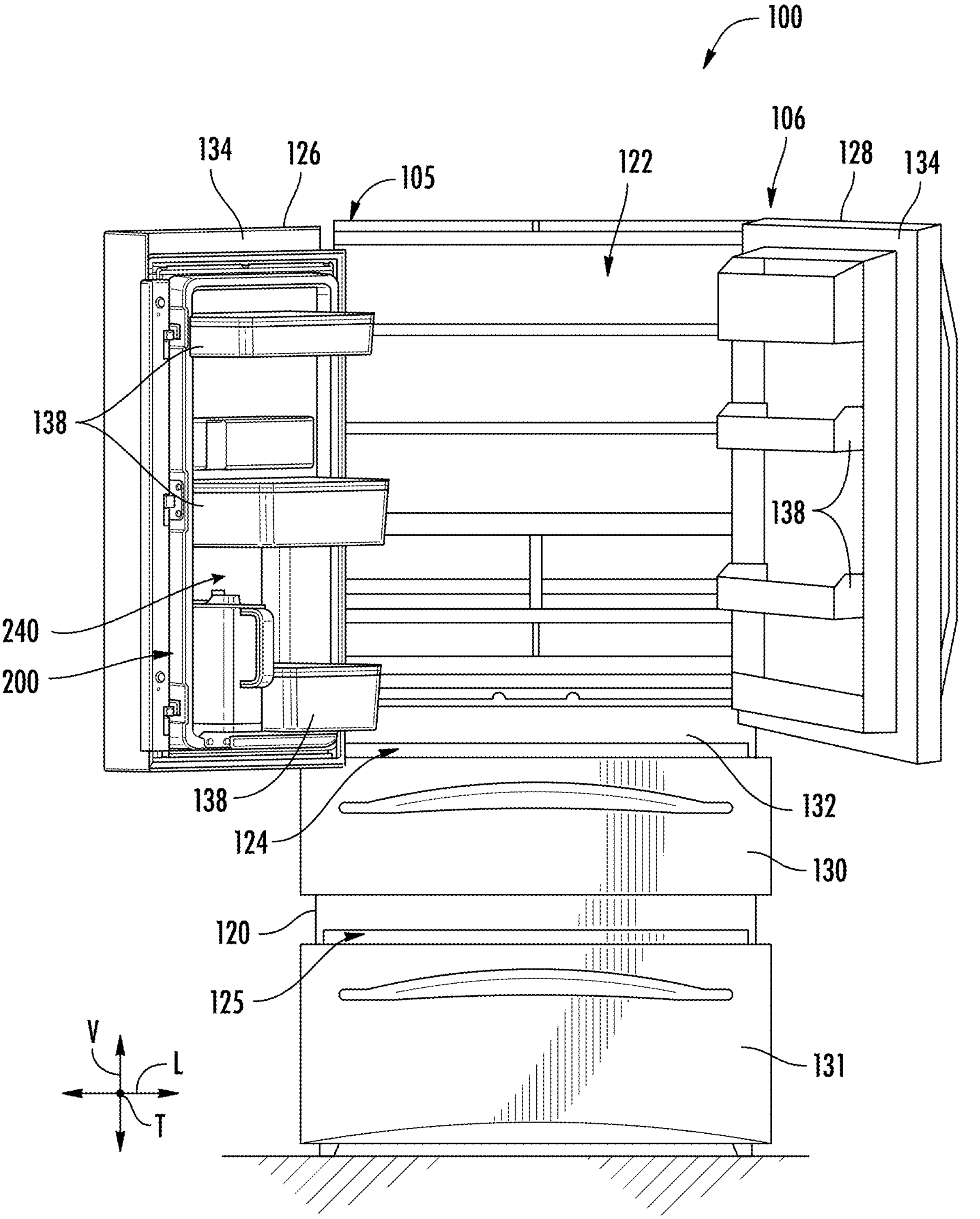
FIG. 2 provides a front view of the refrigerator appliance of FIG. 1 with refrigerator doors shown in an open configuration.

Cabinet 120 defines a chilled chambers for receipt of food items for storage. In particular, cabinet 120 defines fresh food chamber 122 positioned at or adjacent to the top 101 of the cabinet 120 and one or more freezer chambers, such as a first freezer chamber 124 and a second freezer chamber 125, arranged below fresh food chamber 122 along the vertical direction V and at or adjacent the bottom 102 of the cabinet 120. As best illustrated in FIG. 2, fresh food chamber 122 is bounded by vertical walls at the first side 105 and at the second side 106, which are spaced apart in the lateral direction. Likewise, fresh food chamber 122 is bounded by a horizontal wall at the top 101 and by a lower wall 132 at the bottom. As such, refrigerator appliance 100 may generally be referred to as a bottom mount, or bottom freezer, refrigerator. It is recognized, however, that the benefits of the present disclosure apply to other types and styles of refrigerator appliances such as, e.g., a top mount refrigerator appliance, a side-by-side style refrigerator appliance, or a single door refrigerator appliance. Consequently, the description set forth herein is for illustrative purposes only and is not intended to be limiting in any respect to any particular refrigerator chamber configuration.

First and second refrigerator doors 126, 128, respectively, are rotatably hinged to an edge of cabinet 120 at the first side 105 and the second 106 side, respectively, for selectively accessing fresh food chamber 122. Freezer doors, such as a first freezer door 130 and a second freezer door 131, may be arranged below refrigerator doors 126, 128 for selectively accessing the first and second freezer chambers 124, 125, respectively. Freezer doors 130, 131 are coupled to freezer drawers (not shown) slidably mounted within first and second freezer chambers 124, 125. To prevent leakage of cool air, refrigerator doors 126, 128, freezer doors 130, 131, and/or cabinet 120 may define one or more sealing mechanisms (e.g., rubber gaskets, not shown) at the interface where the doors 126, 128, 130, 131 meet cabinet 120. Refrigerator doors 126, 128 and freezer doors 130, 131 are shown in the closed configuration in FIG. 1.

FIG. 2 provides a front view of refrigerator appliance 100 shown with refrigerator doors 126, 128 in the open position. Additionally, freezer doors 130, 131 are shown in partially open positions. As shown in FIG. 2, various storage components are mounted within fresh food chamber 122 to facilitate storage of food items therein as will be understood by those skilled in the art. In particular, the storage components may include bins or shelves 138. Each of these storage components are configured for receipt of food items (e.g., beverages and/or solid food items) and may assist with organizing such food items. As illustrated, bins/shelves 138 may be mounted on refrigerator doors 126, 128 or may slide into a receiving space in fresh food chamber 122. It should be appreciated that the illustrated storage components are used only for the purpose of explanation and that other storage components may be used and may have different sizes, shapes, and configurations.

Additionally, the doors 126, 128 of the refrigerator appliance 100 each include an inner surface 134 (FIG. 2) and an outer surface 136 (FIG. 1). The inner surface 134 of each door 126, 128 generally defines a portion of the interior of fresh food chamber 122 when the doors 126, 128 are in the closed position (FIG. 1). The outer surface 136 of each door 126, 128 generally defines a portion of the exterior of the refrigerator appliance 100 when the doors 126, 128 are in the closed position. Similarly, it should be appreciated that the freezer doors 130, 131 include inner and outer surfaces.

Referring now generally to FIGS. 2 through 7, an autofill pitcher dispensing system 200 which may be used with the refrigerator appliance 100 will be described according to exemplary embodiments of the present subject matter. As best illustrated in FIG. 2, the autofill pitcher dispensing system 200 may be positioned on the first door 126 of the refrigerator appliance 100 within the fresh food chamber 122. However, in other embodiments, the autofill pitcher dispensing system 200 may be positioned in any other suitable location on the refrigerator appliance 100, such as the second door 128 or elsewhere within the fresh food chamber 122.

Figure 3:
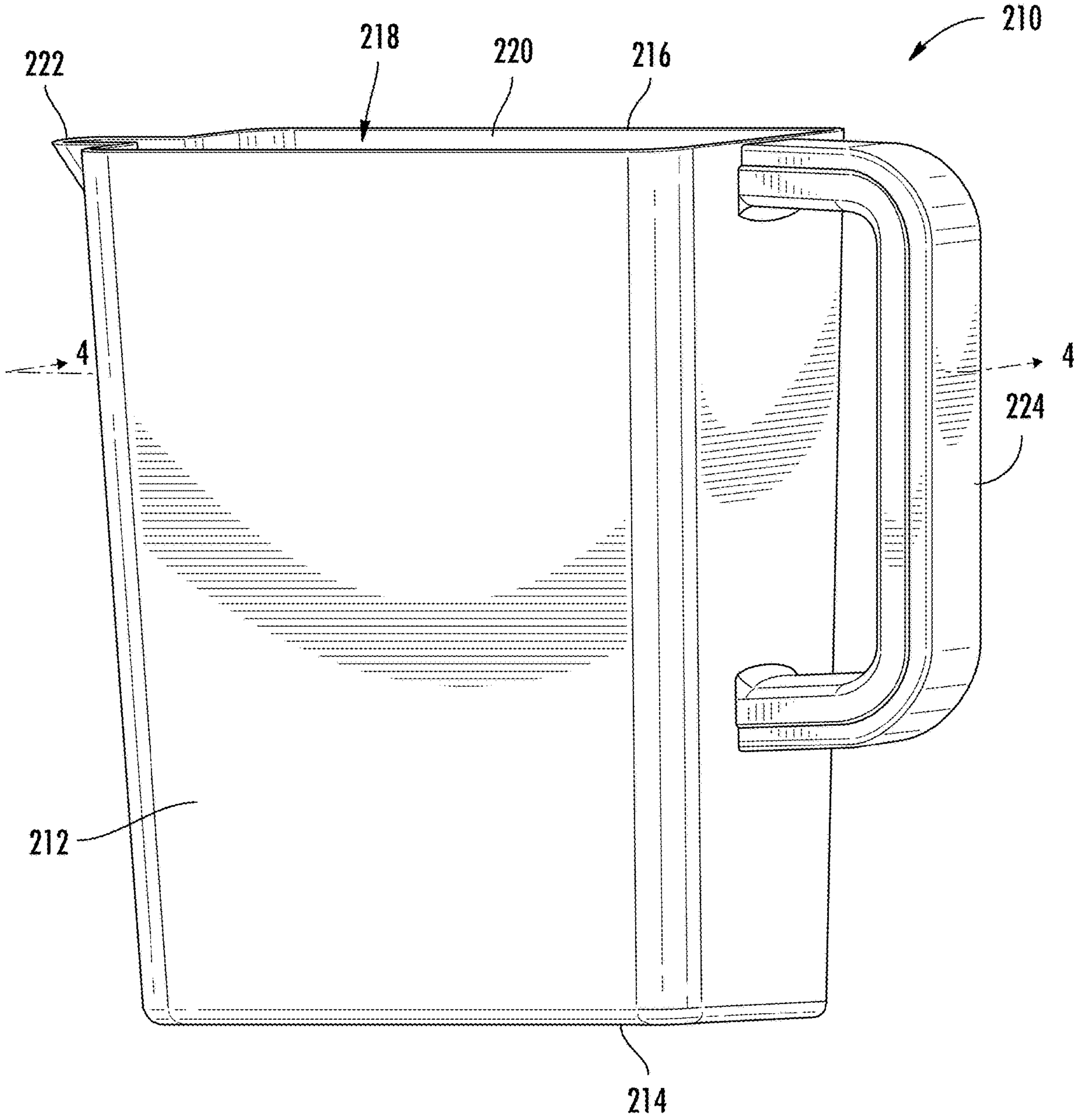
FIG. 3 provides a perspective view of a pitcher in accordance with an embodiment of the present disclosure.
Figure 4:
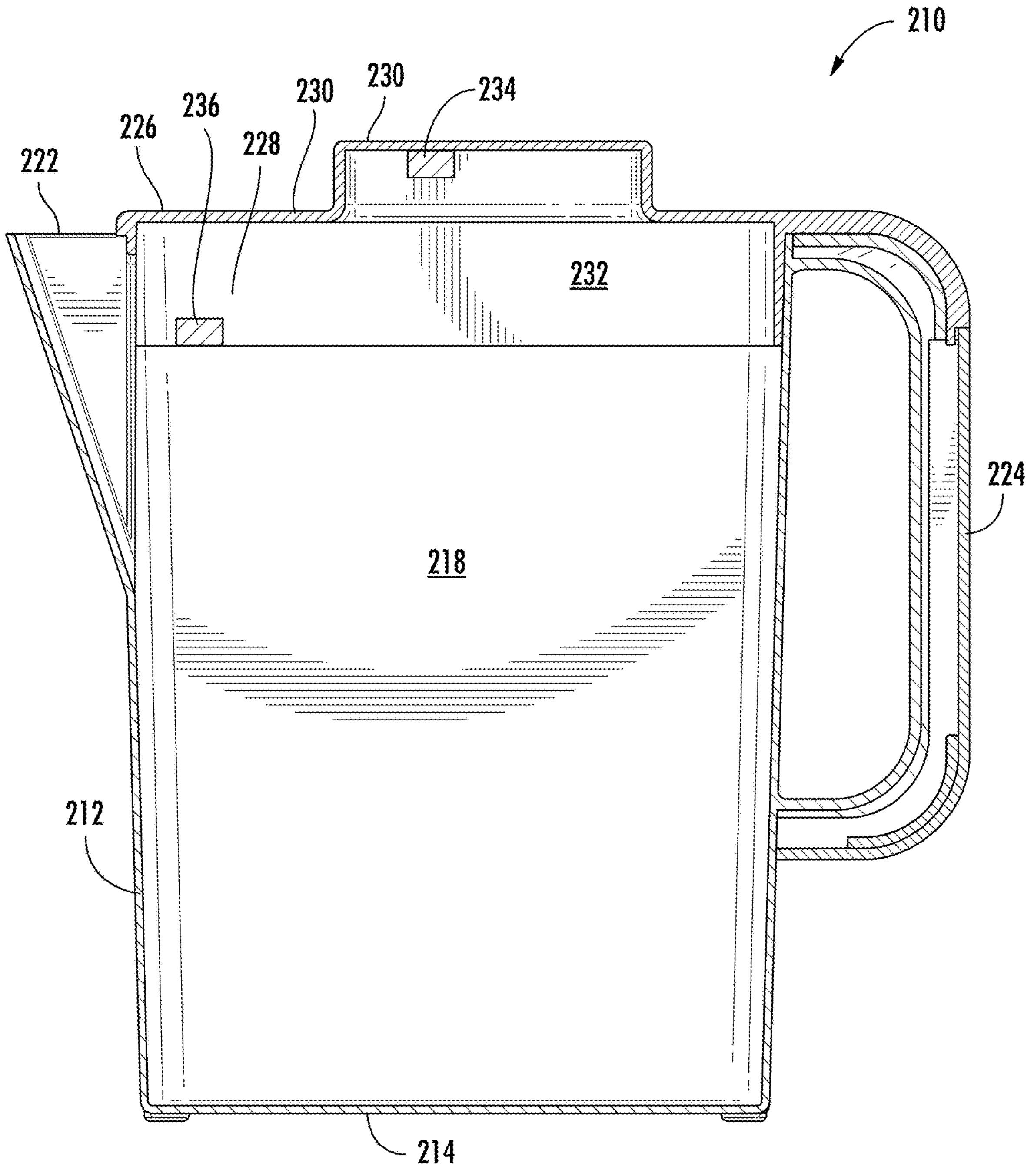
FIG. 4 provides a side cross-sectional view of a pitcher and lid taken about line 4-4 in accordance with an embodiment of the present disclosure.

According to exemplary embodiments, the autofill pitcher dispensing system 200 includes a removable pitcher 210. As best illustrated in FIGS. 3 and 4, the pitcher 210 includes a pitcher wall 212 and a pitcher bottom 214 that is coupled to or formed with the pitcher wall 212. The pitcher wall 212 defines a top edge 216 at the pitcher end opposite the pitcher bottom 214. The pitcher wall 212 and the pitcher bottom 214 define a pitcher interior portion or volume 218, accessible through an opening 220 defined by the top edge 216. The top edge 216 may also define a spout 222 to facilitate directing a liquid into, or out of, the pitcher 210. Additionally, a handle 224 may be coupled to for formed with the pitcher wall 212 to provide a gripping area to aid in manipulating the pitcher 210.

Moreover, as best illustrated in FIG. 4, a lid 226 may be removably coupled to the pitcher 210. As such, the lid 226 may include a peripheral skirt 228 to be removably received within the opening 220 of the pitcher 210. The skirt 228 may include features (not shown) that engage an inner portion of the pitcher wall 212 to secure the lid against accidental separation from the pitcher 210. The lid 226 may include a top wall 230 coupled to or formed with the skirt 228 such that the skirt 228 and the top wall 230 define a cavity or volume 232 within the lid 226.

Additionally, one or more magnets, such as a first magnet 234 and a second magnet 236, may be positioned on or within the removable pitcher 210. The magnets 234, 236 may be moveable to or be biased against or otherwise adjacent to the top wall 230 of the lid 226. As will be described below, when the magnets 234, 236 are at or adjacent to the top wall 230, the magnets 234, 236 may be recognized by one or more electrically operated sensor(s) of the autofill pitcher dispensing system 200 that generate signals indicative of an operational status of the autofill pitcher dispensing system 200.

Figure 5:
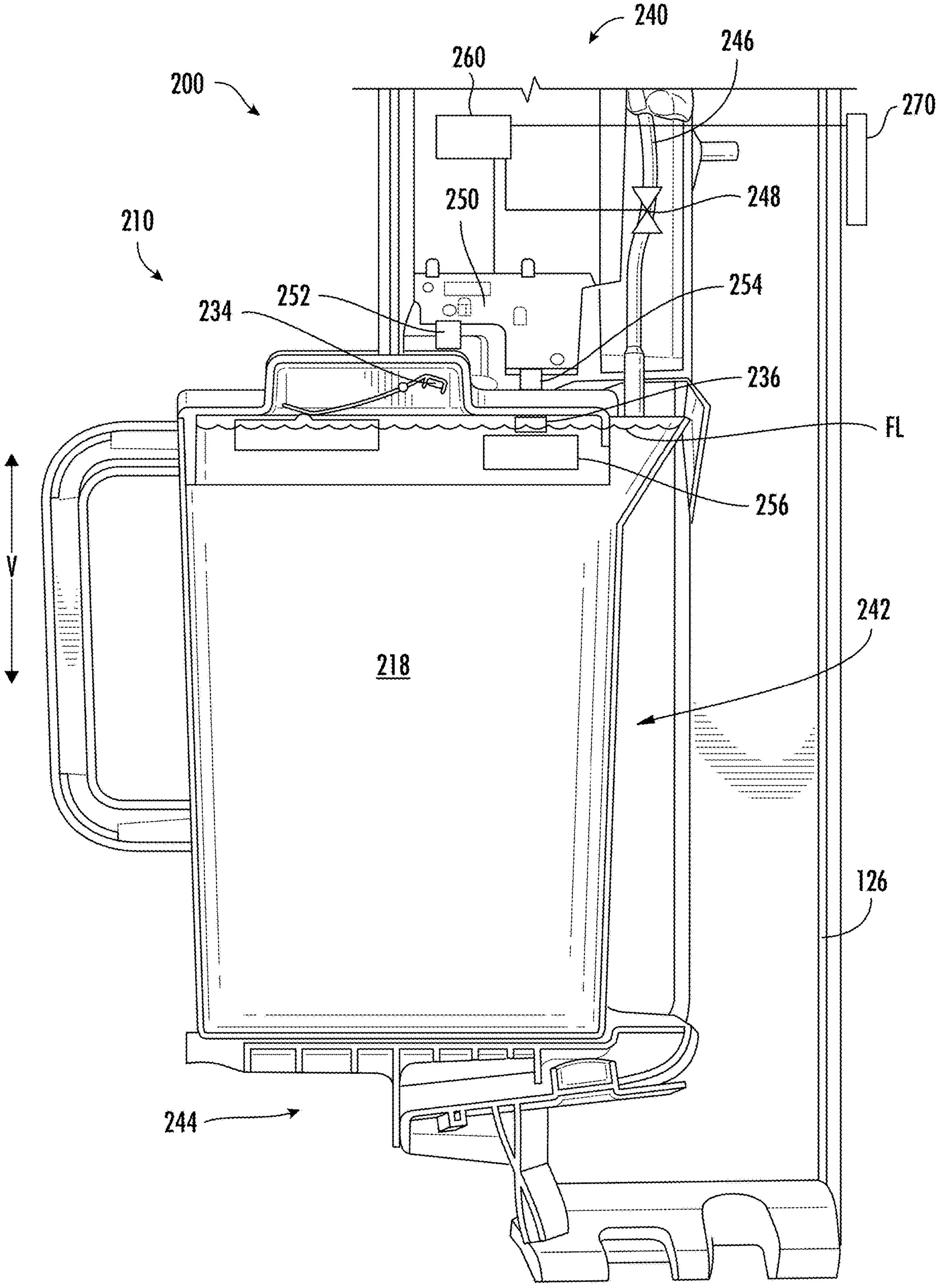
FIG. 5 provides a side view of a pitcher received in a dispenser cavity in accordance with an embodiment of the present disclosure.

According to exemplary embodiments, the autofill pitcher dispensing system 200 includes a dispenser 240 to be used for filling the pitcher 210 with water. As best illustrated in FIG. 5, the dispenser 240 defines a cavity 242 to receive the removable pitcher 210 therein. As shown in the figures, the dispenser 240 is positioned on the inner surface 134 of first door 126 of the refrigerator appliance 100. However, it should be appreciated that the dispenser 240 may be positioned on other doors or elsewhere within the fresh food chamber 122. As illustrated, the cavity 242 includes a support or shelf 244 to support the pitcher 210 in the vertical direction V. Other features (not shown) may be provided to secure the pitcher 210 in the cavity 242 during filling and as the door 126 is open and closed to provide access to the fresh food chamber 122.

Furthermore, the dispenser 240 may include a fill tube 246 for directing water from a water supply (not shown) to and into the interior portion 218 of the pitcher 210. A valve 248 may be fluidly coupled to the fill tube 246 between the water supply and the pitcher 210 and may be selectively adjusted/operated to adjust a flow of the water to and into the interior portion 218 of the pitcher 210. The valve 248 may be operatively coupled to a controller 260 of the autofill pitcher dispensing system 200. In this respect, the valve 248 may be selectively adjusted/operated.

According to exemplary embodiments, the autofill pitcher dispensing system 200 includes a sensor board 250. The sensor board 250 may be positioned adjacent to the lid 224 of the pitcher 210 and include one or more electrically operated sensors for sensing/detecting a presence of the magnets 234, 236 and generating signals indicative of the operational status of the autofill pitcher dispensing system 200. For example, as best shown in FIG. 5, the sensor board 250 includes a first sensor 252 secured in the board and positioned adjacent to the lid 224 to detect the first magnet 234 in the pitcher 210 when the pitcher is present and properly positioned within the cavity 242. When the first sensor 252 senses/detects the presence of the first magnet 234, the first sensor 252 generates and provides a signal to the controller 260 indicative of the presence and proper positioning, or a pitcher present signal, of the pitcher 210 within the cavity 242 of the dispenser 240. The first sensor 252 may be any type of sensor capable of detecting a magnet, such as the first magnet 234, and generating a signal indicative of the operational status of the autofill pitcher dispensing system 200. The controller 260 is electrically or operatively coupled to the sensor board 250 and the first sensor 252 to receive the pitcher present signal from the first sensor 252.

Likewise, as best shown in FIG. 5, the sensor board 250 includes a second sensor 254 secured in the board and positioned adjacent to the lid 224 to detect the second magnet 236 in the pitcher 210 when a fluid level FL within the interior portion 218 of the pitcher 210 has reached a particular height within the pitcher. The second magnet 236 may be secured to a floating body 256 that rises within the pitcher 210 as the fluid level FL rises and, thus, moves the magnet 236 toward the second sensor 254. When the second sensor 254 senses/detects the presence of the second magnet 236, the second sensor 254 generates and provides a signal to the controller 260 indicative of the pitcher 210 being full or pitcher fill signal. The second sensor 254 may be any type of sensor capable of detecting a magnet, such as the second magnet 236, and generating a signal indicative of the operational status of the autofill pitcher dispensing system 200. The controller 260 is electrically or operatively coupled to the sensor board 250 and the second sensor 254 to receive the pitcher full signal from the second sensor 254.

Additionally, each of the sensors 252, 254 may also be configured to generate a signal indicative of an output voltage. For example, when the sensors 252, 254 detect the presence of the corresponding magnets 234, 236, the sensors 252, 254 may generate an output voltage. Under normal, non-leaking operations, the output voltages generated by the sensors 252, 254 may correspond to particular quantity values or range of quantity values. Sometimes, during autofill operations, the sensors 252, 254 and other sensors of the autofill pitcher dispensing system 200 are exposed to external water or "leaks" due to splashing, overfilling of the pitcher 210, condensation, improper assembly of the pitcher 210 or other components of the autofill pitcher dispensing system 200, and/or the like. The external water may reach and contact the sensors, such as the first and second sensors 252, 254, of the autofill pitcher dispensing system 200. Such external water may interfere with sensor operations and lead to false readings. Additionally, the external water may create new electrical current pathways within the sensors 252, 254, which may change the output voltage amount of the sensors 252, 254. As will be described below, the signals indicative of the output voltages of the sensors 252, 254 may be received and used by the controller 260 to determine when the autofill pitcher dispensing system 200 is experiencing a leak condition.

According to exemplary embodiments, the autofill pitcher dispensing system 200 includes the controller 260. The controller 260 controls the operation of the autofill pitcher dispensing system 200 in that it receives and interprets signals from sensors, such as the sensors 252, 254, of the dispenser 240 and determines when the autofill operation should initiate and when it should stop. As such, the controller 260 may be electrically or operatively coupled to the valve 248 such that the controller 260 may selectively control an operation of the valve 248 to adjust a flow of the water to and into the interior portion 218 of the pitcher 210 according to the determinations of when the autofill operation should initiate and when it should stop. Additionally, as will be described below, the controller 260 may be configured to receive signals from sensors indicative of the output voltage from the sensors, such as the sensors 252, 254, and determine when the autofill pitcher dispensing system 200 is experiencing a leaking condition based on the signals. The controller 260 may include control circuits, a memory, and microprocessor, such as a general purpose or special purpose microprocessor operable to execute programming instructions or micro-control code associated with the operation of the autofill pitcher dispensing system 200. Alternatively, the controller 260 may be constructed without using a microprocessor, e.g., using a combination of discrete analog or digital logic circuitry to perform control functionality instead of relying on software.

According to exemplary embodiments, a user interface 270 may be electrically or operatively coupled to the controller 260 and configured to provide feedback from the controller 260 (e.g., feedback associated with a leak condition of the autofill pitcher dispensing system 200) to the operator. As such, the user interface 270 may include one or more feedback devices (not shown), such as display screens, speakers, warning lights, and/or the like, which are configured to provide feedback from the controller 260 to the operator. Furthermore, some embodiments of the user interface 270 may include one or more input devices, such as touchscreens, touchpads, buttons, sliders, switches, and/or the like, which are configured to receive inputs from the operator. In one embodiment, the user interface 270 may be mounted or otherwise positioned on the cabinet 120 of the refrigerator appliance 100. However, in alternative embodiments, the user interface 270 may mounted at any other suitable location.

Figure 6:
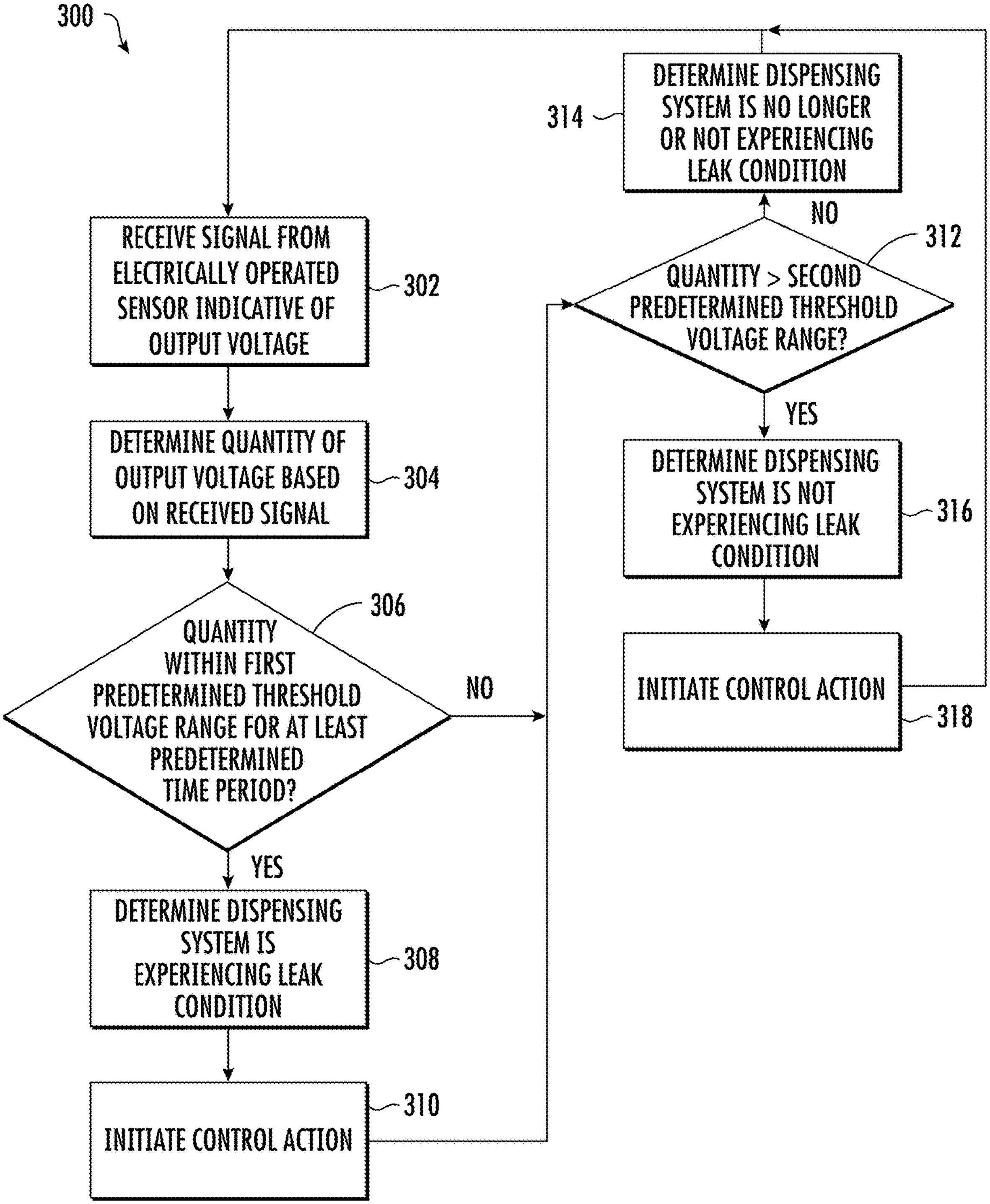
FIG. 6 provides a flow diagram of one embodiment of control logic for detecting a leak condition of the autofill pitcher dispenser system of a refrigerator appliance in accordance with an embodiment of the present disclosure.

Referring now to FIG. 6, a flow diagram of one embodiment of control logic 300 that may be executed by the controller 260 (or any other suitable controller) for determining when an autofill pitcher dispensing system is experiencing a leak condition is illustrated in accordance with aspects of the present subject matter. Specifically, the control logic 300 shown in FIG. 6 is representative of steps of one embodiment of an algorithm that can be executed to determine when the autofill pitcher dispenser system 200 is experiencing a leak condition based on signals indicative of output voltages generated by sensors, such as the first sensor 234 and the second sensor 236.

As shown in FIG. 6, at (302), the control logic 300 includes receiving a signal from an electrically operated sensor indicative of an output voltage generated by the electrically operated sensor. Specifically, as described above, the controller 260 may be electrically or operatively coupled to the first sensor 252 and the second sensor 254. As such, the controller 260 may be configured to receive a signal from the first sensor 252 and/or the second sensor 254 indicative of an output voltage generated by the respective first sensor 252 and/or second sensor 254.

Additionally, at (304), the control logic 300 includes determining a quantity of the output voltage based on the received signal. Specifically, the controller 260 may be configured to determine the quantity (e.g., in volts), of the output voltage generated by the sensors 252, 254 from the received signal. For example, in one embodiment, the controller 260 may determine the quantity of the output voltage from the strength of the received signal. In this respect, the controller 260 may include a lookup table that correlates the strength of the received signal with output voltage values. However, in other embodiments, the controller 260 may include a voltmeter or other sensing or measuring device incorporated therein such that the controller 260 may measure and determine the quantity of the received output voltage of the first sensor 252 and the second sensor 254 directly.

Figure 7:
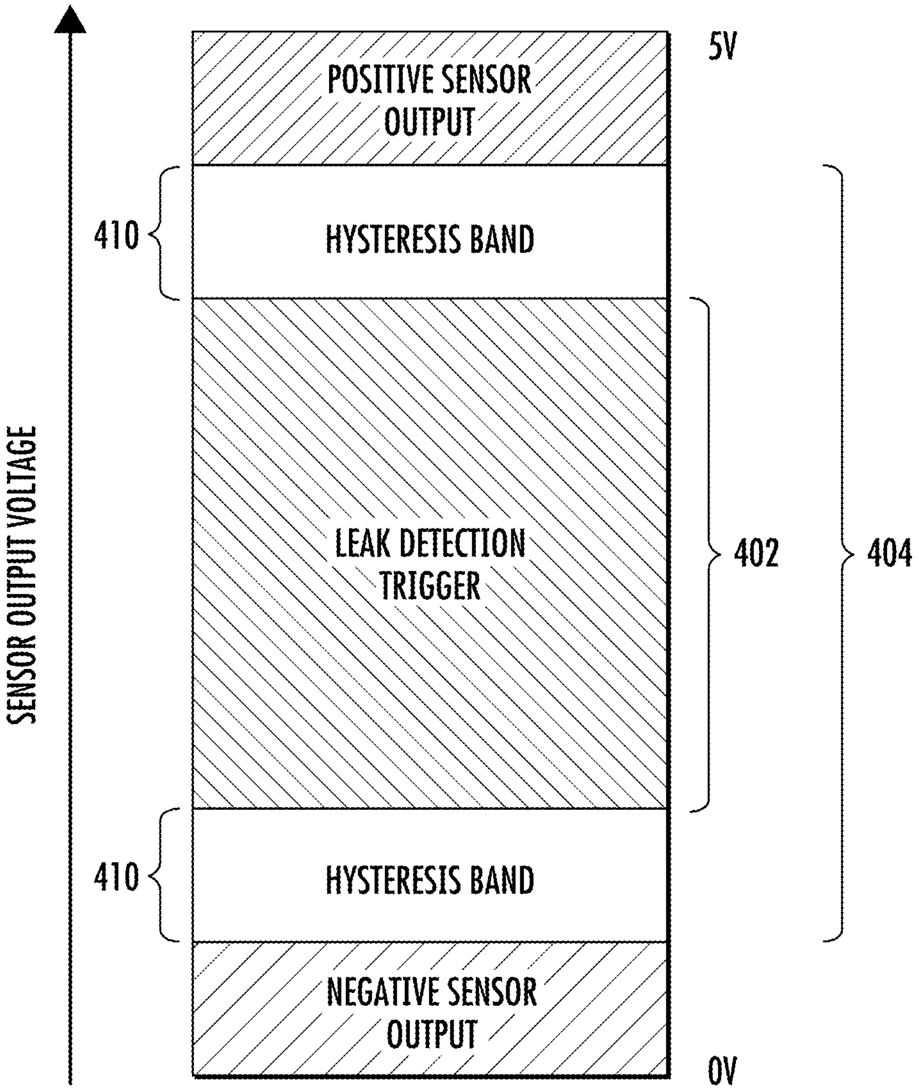
FIG. 7 provides a diagrammatic view of example output voltage ranges used for detecting a leak condition of the autofill pitcher dispenser system of the refrigerator appliance in accordance with an embodiment of the present disclosure.

Furthermore, at (306), the control logic 300 includes comparing the determined quantity of the output voltage to a first predetermined threshold output voltage range. Specifically, the controller 260 may be configured to compare the quantity of the output voltage determined at (304) from each sensor 252, 254 to a first predetermined threshold output voltage range 402 (FIG. 7). The first predetermined threshold output voltage range 402 may be a threshold range within which the quantity of the output voltage of one of the sensors 252, 254 falls for at least a predetermined time period when the leaking condition is present. The predetermined time period may correspond to an error tolerance time to account for false sensor readings. As such, when the output voltage determined at (304) from at least one of the sensors 252, 254 falls within the first predetermined threshold output voltage range 402 for at least the predetermined time period, it is likely that the leaking condition of the autofill pitcher dispensing system 200 is present. In such instances, the control logic 300 proceeds to (308). Conversely, when the output voltage determined at (304) from all of the sensors 252, 254 is outside of the first predetermined threshold output voltage range 402, the control logic 300 proceeds to (312).

Moreover, as shown in FIG. 6, at (308), the control logic 300 includes determining that the autofill pitcher dispensing system is experiencing the leaking condition when the determined quantity is within the first predetermined output voltage range. Specifically, the controller 260 is configured to determine that the autofill pitcher dispensing system 200 is experiencing the leaking condition when the quantity of the output voltage determined at (304) is within the first predetermined output voltage range 402. Additionally, in some embodiments, the controller 260 may be configured to determine that the autofill pitcher dispensing system 200 is experiencing the leaking condition when the quantity of the output voltage determined at (304) is within the first predetermined output voltage range 402 for a predetermined time period, e.g., longer than a second. As such, the controller 260 may be able to weed out voltage spikes unrelated to the leak condition and/or leak conditions that are corrected/resolved.

Furthermore, at (310), the control logic 300 includes initiating a control action when determined that the autofill pitcher dispensing system is experiencing the leaking condition. Specifically, the controller 260 is configured to initiate the control action when the autofill pitcher dispensing system 200 is experiencing the leaking condition as determined at (308). For example, in some embodiments, the control action may include the controller 260 halting dispensing operations for prohibiting water from being dispensed from the fill tube 246, such as by selectively operating/adjusting the valve 248 of the dispenser 240 to halt the flow of water to the pitcher 210. Additionally, or alternatively, in some embodiments, the control action may include notifying an operator of the refrigerator appliance 100 that the autofill pitcher dispensing system 200 is experiencing the leaking condition. For example, the user interface 270 may display a warning light or make a noise indicating to the user of the leaking condition. Thereafter, the control logic 300 may proceed to (312).

Moreover, as shown in FIG. 6, at (312), the control logic 300 includes comparing the determined quantity of the output voltage to a second predetermined threshold output voltage range larger than, and inclusive of, the first predetermined threshold output voltage range. Specifically, the controller 260 may be configured to compare the quantity of the output voltage determined at (304) from each sensor 252, 254 to a second predetermined threshold output voltage range 404 (FIG. 7). The second predetermined threshold output voltage range 404 may be a threshold range that includes and is larger than the first predetermined threshold output voltage range 404. The second predetermined threshold output voltage range 404 may thus include hysteresis bands 410, one of which corresponds to a range of quantity values greater than any quantity value within the first predetermined threshold output voltage range 402, and another of which corresponds to a range of quantity values less than any quantity value within the first predetermined threshold output voltage range 402. The hysteresis bands 410 correspond to the portions of the second predetermined threshold output voltage range 404 within which the quantity of the output voltage of both of the sensors 252, 254 fall when the leaking condition is not present or no longer present. When the leaking condition is no longer present (e.g., following control logic step 310), as opposed to not present (e.g., following control logic step 306), water dispensing operations will not be resumed until the quantity of the output voltage of both of the sensors 252, 254 determined at (304) are outside of, e.g., greater than or less than, any quantity values within the second predetermined threshold output range 404. In such instances, the control logic 300 proceeds to (314). Conversely, when the output voltage determined at (304) from all of the sensors 252, 254 is outside of the second predetermined threshold output voltage range 404, the control logic 300 proceeds to (316).

Additionally, at (314), the control logic 300 includes determining that the autofill pitcher dispensing system is no longer or is not experiencing a leaking condition when the determined quantity is outside of the first predetermined output voltage range and within the second predetermined output voltage range. Specifically, the controller 260 is configured to determine that the autofill pitcher dispensing system 200 is no longer experiencing or not experiencing the leaking condition when the quantity of the output voltage determined at (304) is outside of the first predetermined output voltage range 402 and within the second predetermined output voltage range 404. When the controller 260 determines that the autofill pitcher dispensing system 200 is no longer experiencing the leaking condition, e.g., control logic step 314 follows control logic step 310, the water dispensing operations are not resumed. Alternatively, when the controller 260 determines that the autofill pitcher dispensing system 200 is not experiencing the leaking condition, e.g., control logic step 314 does not follow control logic step 310, the water dispensing operations are maintained when water dispensing operations were already in progress. Thereafter, the control logic 300 returns to (302).

Furthermore, at (316), the control logic 300 includes determining that the autofill pitcher dispensing system is not experiencing the leaking condition when the determined quantity of the output voltage is outside of the second predetermined output voltage range. Specifically, the controller 260 is configured to determine that the autofill pitcher dispensing system 200 is not experiencing the leaking condition when the quantity of the output voltage determined at (304) is outside of the second predetermined output voltage range 404. Thereafter, the control logic 300 proceeds to (318).

Additionally, as shown in FIG. 6, at (318), the control logic 300 includes initiating a control action when determined that the autofill pitcher dispensing system is not experiencing the leaking condition, the control action including resuming dispensing operations for allowing water to be dispensed from the fill tube. Specifically, the controller 260 is configured to resume dispensing operations for allowing water to be dispensed from the fill tube 246, such as by selectively operating/adjusting the valve 248 of the dispenser 240 to allow or resume the flow of water to the pitcher 210 when the autofill pitcher dispensing system 200 is not experiencing the leaking condition as determined at (316). Thereafter, the control logic 300 returns to (302).

As explained herein, aspects of the present subject matter are generally directed to an autofill pitcher dispenser system design of a refrigerator appliance that includes an electrically operated sensor configured to generate an output voltage and a controller configured to determine the quantity of the output voltage generated by the sensor, compare the quantity of the output voltage to an output voltage threshold range, and determine that the dispensing system is experiencing a leaking condition when the quantity of the output voltage is within the output voltage threshold range. This autofill pitcher dispensing assembly including the controller configured to execute the specified control logic allows determination of the leak condition from the output voltages so that autofill operations of the pitcher can be controlled to ensure that water is not dispensed when leak conditions are detected.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A refrigerator appliance defining a vertical direction, a lateral direction, and a transverse direction, the refrigerator appliance comprising:

a cabinet defining a chilled chamber;

a door being rotatably hinged to the cabinet to provide selective access to the chilled chamber; and an autofill pitcher dispensing system comprising:

a removable pitcher defining an interior portion;

a dispenser defining a cavity within the chilled chamber to receive the removable pitcher, the dispenser including a fill tube for directing water from a water supply into the interior portion of the removable pitcher;

an electrically operated sensor configured to detect an operational status of the autofill pitcher dispensing system, the electrically operated sensor also configured to generate a signal associated with the detected operational status; and a controller electrically coupled to the electrically operated sensor, the controller configured to:

determine when the autofill pitcher dispensing system is experiencing a leaking condition based on an output voltage generated by the electrically operated sensor, the output voltage associated with the detected operational status;

determine a quantity of the output voltage generated by the electrically operated sensor;

compare the determined quantity of the output voltage to a first predetermined threshold output voltage range;

determine that the autofill pitcher dispensing system is experiencing the leaking condition when the determined quantity of the output voltage is within the first predetermined threshold output voltage range; and determine that the autofill pitcher dispensing system is not experiencing the leaking condition when the determined quantity of the output voltage is outside of a second predetermined threshold output voltage range different than the first predetermined threshold output voltage range.

2. The refrigerator appliance of claim 1, wherein the controller is further configured to:

initiate a control action when determined that the autofill pitcher dispensing system is experiencing the leaking condition.

3. The refrigerator appliance of claim 2, wherein:

the control action comprises notifying an operator of the refrigerator appliance that the autofill pitcher dispensing system is experiencing the leaking condition.

4. The refrigerator appliance of claim 2, wherein:

the control action comprises halting dispensing operations for prohibiting water from being dispensed from the fill tube.

5. The refrigerator appliance of claim 1, wherein, when determining when the autofill pitcher dispensing system is experiencing the leaking condition, the controller is configured to:

determine that the autofill pitcher dispensing system is experiencing the leaking condition when the determined quantity of the output voltage is within the first predetermined threshold output voltage range for at least a predetermined time period.

6. The refrigerator appliance of claim 1, wherein the controller is further configured to:

initiate a control action when determined that the autofill pitcher dispensing system is not experiencing the leaking condition, the control action comprising resuming dispensing operations for allowing water to be dispensed from the fill tube.

7. The refrigerator appliance of claim 1, wherein:

the second predetermined threshold output voltage range is larger than the first predetermined threshold output voltage range.

8. The refrigerator appliance of claim 1, wherein:

the first predetermined threshold output voltage range is included within the second predetermined threshold output voltage range.

9. The refrigerator appliance of claim 1, wherein:

the electrically operated sensor is configured to detect a presence of a magnet indicating a fill level of the interior portion of the removable pitcher.

10. The refrigerator appliance of claim 1, wherein:

the electrically operated sensor is configured to detect a presence of a magnet indicating a presence of the removable pitcher within the cavity defined by the dispenser.

11. An autofill pitcher dispensing system for a refrigerator appliance defining a vertical direction, a lateral direction, and a transverse direction, the refrigerator appliance including a cabinet defining a chilled chamber and a door being rotatably hinged to the cabinet to provide selective access to the chilled chamber, the autofill pitcher dispensing system comprising:

a removable pitcher defining an interior portion;

a dispenser defining a cavity within the chilled chamber to receive the removable pitcher, the dispenser including a fill tube for directing water from a water supply into the interior portion of the removable pitcher;

an electrically operated sensor configured to detect an operational status of the autofill pitcher dispensing system, the electrically operated sensor also configured to generate a signal associated with the detected operational status; and a controller electrically coupled to the electrically operated sensor, the controller configured to:

determine when the autofill pitcher dispensing system is experiencing a leaking condition based on an output voltage generated by the electrically operated sensor, the output voltage associated with the detected operational status;

determine a quantity of the output voltage generated by the electrically operated sensor;

compare the determined quantity of the output voltage to a first predetermined threshold output voltage range;

determine that the autofill pitcher dispensing system is experiencing the leaking condition when the determined quantity of the output voltage is within the first predetermined threshold output voltage range; and determine that the autofill pitcher dispensing system is not experiencing the leaking condition when the determined quantity of the output voltage is outside of a second predetermined threshold output voltage range different than the first predetermined threshold output voltage range.

12. The autofill pitcher dispensing system of claim 11, wherein the controller is further configured to:

halt dispensing operations for prohibiting water from being dispensed from the fill tube.

13. The autofill pitcher dispensing system of claim 11, wherein, when determining when the autofill pitcher dispensing system is experiencing the leaking condition, the controller is configured to:

determine that the autofill pitcher dispensing system is experiencing the leaking condition when the determined quantity of the output voltage is within the first predetermined threshold output voltage range for at least a predetermined time period.

14. The autofill pitcher dispensing system of claim 11, wherein the controller is further configured to:

initiate a control action when determined that the autofill pitcher dispensing system is not experiencing the leaking condition, the control action comprising resuming dispensing operations for allowing water to be dispensed from the fill tube.

15. The autofill pitcher dispensing system of claim 11, wherein:

the second predetermined threshold output voltage range is larger than the first predetermined threshold output voltage range.

16. The autofill pitcher dispensing system of claim 11, wherein:

the first predetermined threshold output voltage range is included within the second predetermined threshold output voltage range.

* * * * *